No. 755,706. PATENTED MAR. 29, 1904.
F. SCHELLENBACH.
STOOL.
APPLICATION FILED SEPT. 22, 1903.
NO MODEL.

WITNESSES.
Samuel S. Carr.
Nelle E. Carr

Florence Schellenbach, INVENTOR.
By Robert S. Carr,
Atty.

No. 755,706.

Patented March 29, 1904.

UNITED STATES PATENT OFFICE.

FLORENCE SCHELLENBACH, OF CLEVELAND, TENNESSEE.

STOOL.

SPECIFICATION forming part of Letters Patent No. 755,706, dated March 29, 1904.

Application filed September 22, 1903. Serial No. 174,190. (No model.)

*To all whom it may concern:*

Be it known that I, FLORENCE SCHELLENBACH, a citizen of the United States, residing at Cleveland, Tennessee, have invented a new and useful Improvement in Stools, of which the following is a specification.

My invention relates to stools of the class adapted to the use of dressmakers and others; and the objects of my improvement are to provide means to adjust and maintain the top portion of the stool in different positions of elevation, to make the top surface or platform rotatively adjustable, and to provide a longitudinal extension therefor. These objects are attained in the following described manner, as illustrated in the accompanying drawings, in which—

Figure 1:
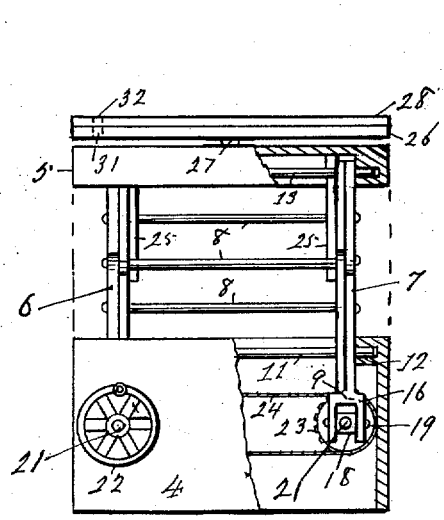
Figure 2:
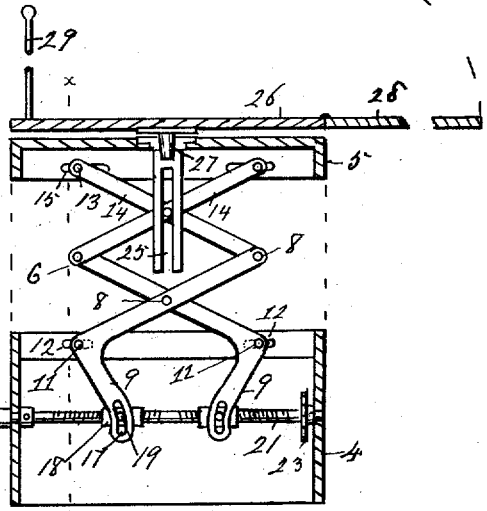

Figure 1 is a front elevation with parts in section on the line *x x* of Fig. 2; Fig. 2, a vertical transverse section, and Fig. 3 an isometrical view, of the stool in a closed position.

In the drawings, 4 represents the base, preferably rectangular in form, and 5 a frame which registers therewith and is adjustably supported in different positions of elevation thereon by means of lazy-tongs 6 and 7. Said tongs are mounted on opposite sides and within the base and are preferably connected together by means of rods 8, whose extremities form pintles for the hinges or joints of the lazy-tongs. The lower bars 9 of the lazy-tongs are in the form of bell-cranks, and rods 11 are extended through the angles thereof and terminate and are laterally movable within slots 12, which are formed in the sides of the base. Rods 13 are extended through the top of bars 14 of the tongs and terminate and are movable laterally in a similar manner in slots 15, which are formed in the sides of the frame 5. The bottom or bell-crank bars each terminates at its lower end in a rectangular yoke 16, whose opposite sides are formed with curved slots 17, that register with each other. Rectangular nuts 18 are mounted in the respective yokes by means of trunnions 19, formed on opposite sides thereof, which are movably secured in the corresponding slots 17 in the sides of the yokes. The nuts in each of the lazy-tongs are formed with right and left hand screw-threads, respectively, and are thereby movably mounted on shafts 21, which are formed with corresponding right and left hand threads on opposite portions of their length. Said shafts are journaled in bearings formed in the base and extend across opposite sides thereof. The end of one shaft projects a short distance outside the base, and hand-wheel 22 is secured thereon. Sprocket-wheels 23, secured on the respective shafts, are connected together by means of sprocket-chain 24, that both shafts will be rotated simultaneously by the hand-wheel. When the said shafts are turned, the nuts thereon are caused to move toward or from each other, together with the lower extremities of bars 9 of the respective lazy-tongs, whereby said tongs are caused to adjust and maintain frame in different elevated positions, as desired. Vertical guides 25, formed with open slots, are secured under frame 5, contiguous to the respective lazy-tongs, and the middle rods 8 are movable in the slots therein to maintain the frame 5 in registration with the base in its different positions of elevation. During the extension or contraction of the lazy-tongs the extremities of rods 11 and 13 are permitted to move toward or from each other in the corresponding slots 12 and 15.

Figure 3:
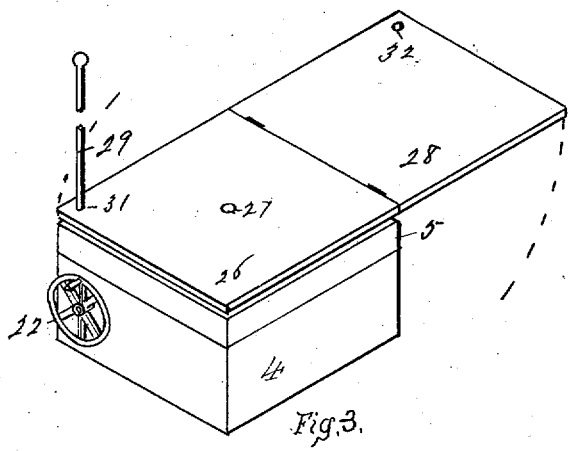

Platform 26, preferably rectangular, is rotatively mounted on the frame 5 by means of a central pivot 27. Longitudinal extension or leaf 28, hinged thereon, may be folded on the top of the platform in registration therewith, as shown in Fig. 2, or opened, as shown in Figs. 1 and 3, to double the area and length of the platform. Post or hand-rest 29 is movably inserted in a hole or socket 31, formed in one front corner of the platform or in a hole 32, which is formed in the leaf.

In operation a lady stands on the stool while her dress is being fitted. By placing her hand on the hand-rest it is less difficult to maintain the same position during the adjustment of the platform to different elevations as desired by the dressmaker in fitting different portions of the dress or skirt and during its different rotative adjustments in relation to the fixed position of the windows or other source of light. The extension of the platform by means of the leaf serves to support the trail of a dress-skirt when desired. The stool may be used also as a cutting-table for dressmakers or others and will be found useful and convenient for many other purposes.

Having fully described my improvement, what I claim as my invention, and desire to secure by Letters Patent of the United States, is—

1. In a stool, a base, lazy-tongs mounted on opposite sides thereof, a screw mechanism engaging with each of said lazy-tongs, and means connecting them together whereby said lazy-tongs are actuated simultaneously, of a frame mounted on the lazy-tongs and adjustably maintained in different vertical positions thereby, a platform rotatively adjustable on the frame and a guide depending from the frame in movable engagement with the lazy-tongs to maintain the frame in registration with the base in its different positions of adjustment.

2. In a stool, the combination with a rectangular base, a vertically-adjustable frame in registration therewith, a rectangular platform mounted thereon and rotatively adjustable in registration therewith, and a leaf hinged on one edge of the platform adapted to fold thereon and in registration therewith to double the area of the platform when opened, of lazy-tongs mounted in the base and engaging with the frame, screw mechanism arranged to actuate the lazy-tongs to move and maintain the frame in different vertical positions, and a vertical guide formed with an open slot depending from the frame and in movable engagement with the lazy-tongs, for the purpose specified.

3. In a stool, the combination with a base formed with horizontal slots in its opposite sides, a frame formed with similar slots in its sides and vertically adjustable thereon, lazy-tongs movably mounted in the slots in the base and movably engaging with the slots in the frame, of a vertical guide formed with an open slot depending from the frame and movably engaging with the lazy-tongs, and screw mechanism mounted in the base and arranged to actuate the lazy-tongs to move and maintain the frame in different elevated positions.

FLORENCE SCHELLENBACH.

Witnesses:
J. D. PATTON,
ISABEL CAMPBELL.